(No Model.)

G. H. WEBB.
MACHINE FOR CHAMFERING NUTS.

No. 433,666. Patented Aug. 5, 1890.

WITNESSES.  INVENTOR.

UNITED STATES PATENT OFFICE.

GEORGE H. WEBB, OF PAWTUCKET, RHODE ISLAND.

MACHINE FOR CHAMFERING NUTS.

SPECIFICATION forming part of Letters Patent No. 433,666, dated August 5, 1890.

Application filed March 27, 1890. Serial No. 345,574. (No model.)

*To all whom it may concern:*

Be it known that I, GEORGE H. WEBB, of the city of Pawtucket, in the county of Providence, in the State of Rhode Island, have invented a certain new and useful Improvement in Machines for Chamfering Nuts; and I declare the following to be a specification thereof, reference being had to the accompanying drawings.

Like letters indicate like parts.

Figures 1, 2:
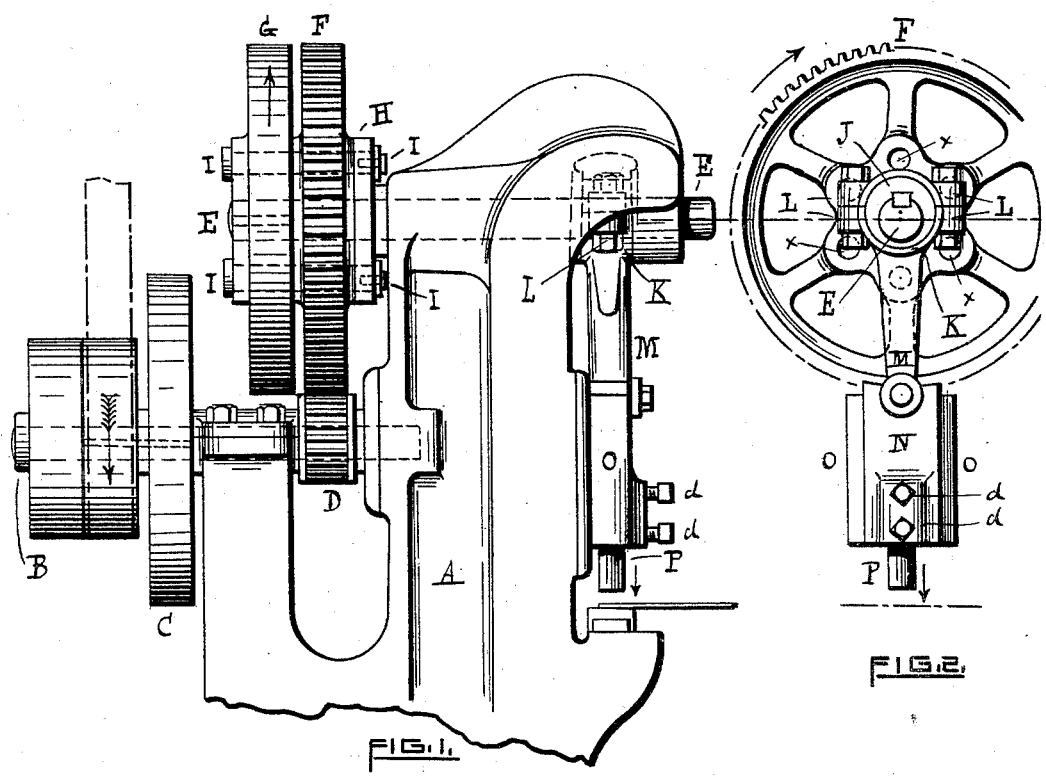
Figures 3, 4, 5:
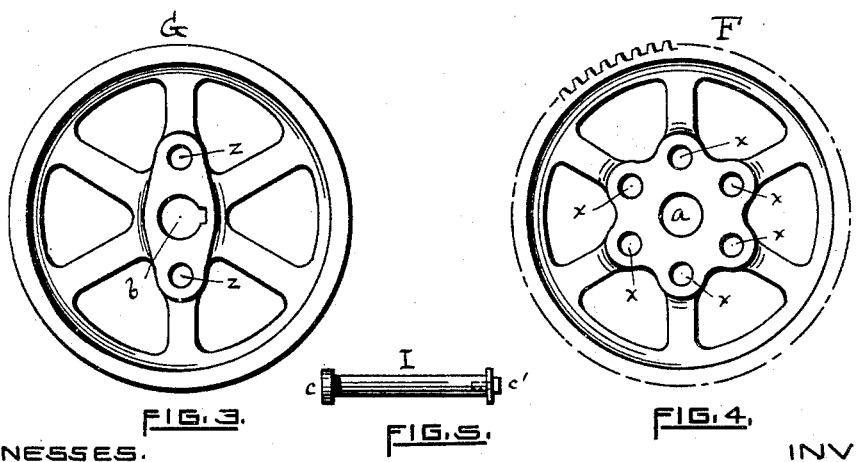

Figure 1 is a side elevation of my invention. Fig. 2 is a front elevation of the same. Figs. 3, 4, and 5 are detail views.

My invention relates to that class of presses used in the manufacture of nuts to chamfer or cut them; and it consists of a geared wheel having a diametrically-enlarged hub, in which is a series of four or more equidistant holes or openings, in combination with a clutch-block and a balance-wheel having an elongated hub, all mounted on the same shaft, said balance-wheel and clutch-block having two holes diametrically opposite each other and clutch-pins which pass through the corresponding openings of said geared wheel, balance-wheel, and clutch-block, to fasten them together.

The purpose of my invention is to secure a more steady revolution of said wheels and a more uniform movement of the chamfering mechanism, and especially to relieve said geared wheel from the irregular strain and liability of breakage experienced in the use of such presses as hitherto constructed.

In the drawings, A represents the frame of the machine.

B is the driving-shaft having the usual fast and loose pulleys. C is a balance-wheel splined to said shaft, and serves to accumulate momentum. A pinion D is mounted on said shaft, as shown. Through the head of the frame-work a shaft E passes, on which is a geared wheel F, engaging with and driven by the pinion D. The wheel F is cogged on its periphery and has an enlarged hub and a central opening $a$, by which it fits on the shaft E. A series of holes $x$ (of which six are shown in Fig. 4) are made through the hub, and are located so as to be in pairs diametrically opposite and equidistant from the center of the wheel. As many holes $x$ may be made as are desired; but there should be at least four, and if the wheel F has spokes it is advisable to locate these holes to correspond radially with said spokes.

A balance-wheel G, (seen in front elevation in Fig. 3,) has an elongated hub and central opening $b$, by which it is mounted upon the shaft E. Two holes $z$ are made diametrically opposite each other through the hub of the wheel G, which are located so as to exactly correspond in position with either pair of the holes $x$ of the wheel F. The clutch-block H is also mounted on the shaft E, and has two holes corresponding in position with those of the wheel G. Clutch-pins I, having a suitable head $b$ and nut or bolt $c$, pass through the holes $z$ of the wheel G and through the corresponding holes of the wheel F and clutch-block H, thus compelling them to revolve together. The wheel G and clutch-block H are fastened to the shaft E by a spline, but the wheel F is loosely mounted on said shaft. By withdrawing the pins I the wheel F may be turned independently of the shaft, and any pair of holes $x$ may be brought into correspondence with the holes of the wheel G and clutch-block H, whereupon the pins I are again inserted and the wheel F is compelled to revolve with the shaft E.

The chamfering mechanism is the same as commonly used. The shaft E has an eccentric-cam J, surrounded by a collar K, in two halves, bolted together through bosses L, or otherwise mounted. The collar K has a pitman M integral therewith, which is pivoted to the slide N, the latter passing between the guides O. In a socket of the slide N is the chamfering tool or plunger P, secured therein by the screws $d$. The revolution of the shaft E thus gives a reciprocating motion to the plunger vertically.

The greatest strain upon this machine in operation is when the chamfering-tool is cupping the nut. The major radius of the eccentric-cam J then extends vertically downward and all the strain comes upon the particular teeth of the cogged wheel F, which are then in engagement with the pinion in the line of that radius. In nut-chamfering presses as commonly made the wheel F is rigidly fastened to the shaft E, and so this strain is borne by the same cogs of the wheel F in each revolution. As a consequence those cogs break after repeated use, and sometimes the rim of the wheel itself is broken by the strain. My improvement is designed to remedy this difficulty. The wheel F is detachable from the shaft E, and by changing the clutch-pins I from one pair of holes $x$ to another set of holes $x$, the strain is brought upon other cogs of the wheel F. In practice I periodically make this change of the position of the wheel F relatively to the wheel G and clutch-block H, and the geared wheel is thus made more durable. This change of adjustment also relieves the spokes or arms of the wheel F from that repeated strain in one place, which in the common machine sometimes causes their fracture, and such strain is periodically transferred from one set of spokes to another, as the position of the wheel F is from time to time altered upon the shaft.

The clutch-pins I have a strong bearing-surface at each end thereof in the wheel G and clutch-block H, respectively, whereby reason of the mass of metal they endure the strain without injury.

Another difficulty experienced in the use of such machines is that as soon as the chamfering-tool is released from its pressure on the nut by the revolution of the wheel and the consequent rising of the plunger, the great power and momentum of the wheel F thus suddenly relieved from this resistance, makes said wheel to "jump," and the cogs then in engagement are subjected to a quick and very violent strain, which sometimes results in breakage. To avoid this irregularity of revolution and to insure a steady and uniform rate of motion, as well as to protect the gearing from the sudden and the unresisted strain, I use the balance-wheel G, mounted upon the shaft, as explained, and united to the cog-wheel F by the clutch-pins I, as already described. The wheel G by its weight regulates the revolution of the shaft and is too massive to be affected by the sudden cessation of resistance on the chamfering-plunger P.

I claim as a novel and useful invention, and desire to secure by Letters Patent—

In a nut-chamfering press, a frame, a shaft having a clutch-block and balance-wheel, each splined to said shaft and each having two holes diametrically opposite each other, a cogged wheel mounted loosely on said shaft and having an enlarged hub, in which are pairs of holes diametrically located, each pair corresponding in location and dimension with the holes of said balance-wheel and clutch-block, clutch-pins engaging said balance-wheel, cogged wheel, and clutch-block through their said holes, chamfering mechanism operated by said shaft, and consisting of an eccentric-cam on the shaft, a collar mounted on said cam and having a pitman, a reciprocating slide and chamfering-tool, in combination with a driving-shaft, having a balance-wheel and pinion, the latter gearing with said cogged wheel, substantially as specified.

GEORGE H. WEBB.

Witnesses:
WARREN R. PERCE,
DANIEL W. FINK.